United States Patent

[11] 3,584,708

[72] Inventor Burnette Heck
Bloomfield Hills, Mich.
[21] Appl. No. 829,349
[22] Filed June 2, 1969
[45] Patented June 15, 1971
[73] Assignee General Motors Corporation
Detroit, Mich.

[54] SEALED LIQUID COOLED BRAKE ASSEMBLY
6 Claims, 3 Drawing Figs.
[52] U.S. Cl. .................................................. 188/71.6,
188/71.8, 188/196 P, 188/264 P, 188/264 E,
192/113 B
[51] Int. Cl. ..................................................... F16d 65/84
[50] Field of Search ........................................... 188/71.8,
196 P, 264.2, 264.22, 264.25, 264 P, 71.6;
192/113.2

[56] References Cited
UNITED STATES PATENTS
2,873,826 2/1959 Werner ....................... 188/264(.22)
2,940,549 6/1960 Hause et al. .................. 188/264 PUX
2,955,683 10/1960 Kelley ........................... 188/264(.2) X
3,112,014 11/1963 Jeffries .......................... 188/196 P
3,061,048 10/1962 Alsobrooks et al. ........... 188/71.6 X

*Primary Examiner*—George E. A. Halvosa
*Attorneys*—W. E. Finken and D. D. McGraw ABSTRACT: A disc brake assembly is mounted on a support member which may be the steering knuckle when utilized as a vehicle front brake, and has a housing formed of a backing plate and a cover welded together with the brake friction discs and apply piston in position in the housing. The brake assembly also receives a wheel hub which drives the rotatable discs as well as a cooling fluid pump positioned adjacent the backing plate and the support member. Thus, the pump is located at or adjacent the split line when the back assembly is removed from the support member. The spindle on which the hub is rotatably mounted is formed as an integral part of the backing plate. The complete unit is installed on the support member with no adjustments or assembly of brake parts being required.

INVENTOR.
Burnette Heck

BY D.D. McGraw
ATTORNEY

SEALED LIQUID COOLED BRAKE ASSEMBLY

The brake arrangement to which the invention relates is preferably in a disc brake embodiment in which cooling fluid is circulated through the brake disc pack and to a remotely located heat exchanger. The cooling system arrangement in a vehicle is the subject matter of U.S. application, Ser. No. 829,572 filed by Donald W. Reynolds on even date herewith, entitled "Brake Fluid Cooling Arrangement" and assigned to the common assignee. The brake assembly embodying the invention may be used in a cooling arrangement of that type or of other suitable types.

The present embodiments are illustrated as front disc brake units for vehicles. The steering knuckle on which the brake assembly is mounted is actually a forging with no spindle. The brake assembly includes a steel forged backing plate with a spindle and a steel cover which contains the brake apply piston and the brake disc pack. It is contemplated that, in some instances, the spindle may be formed as a part of the steel knuckle, however. The piston and the brake disc pack are preassembled in the cover and the cover and backing plate are secured together in a permanent manner such as welding so that the brake assembly is not readily disassembled in the field. The complete brake assembly unit is pretested and adjusted after assembly, the welding operation is performed, and the assembly is then installed by bolting it to the steering knuckle. It requires no adjustments or assembly of brake parts either on a vehicle production line or in field service. By eliminating all bolts other than the mounting bolts (of which three are used in the embodiments shown), and using a simple adjusting mechanism, the brake assembly is made of many less parts than previous brake assemblies, retains its sealed fluid integrity by eliminating disassembly of the units in service, and not only permits but requires replacement as a unit should the need occur. Such replacement can be done with minimum mechanical knowledge.

IN THE DRAWINGS

Figure 1:
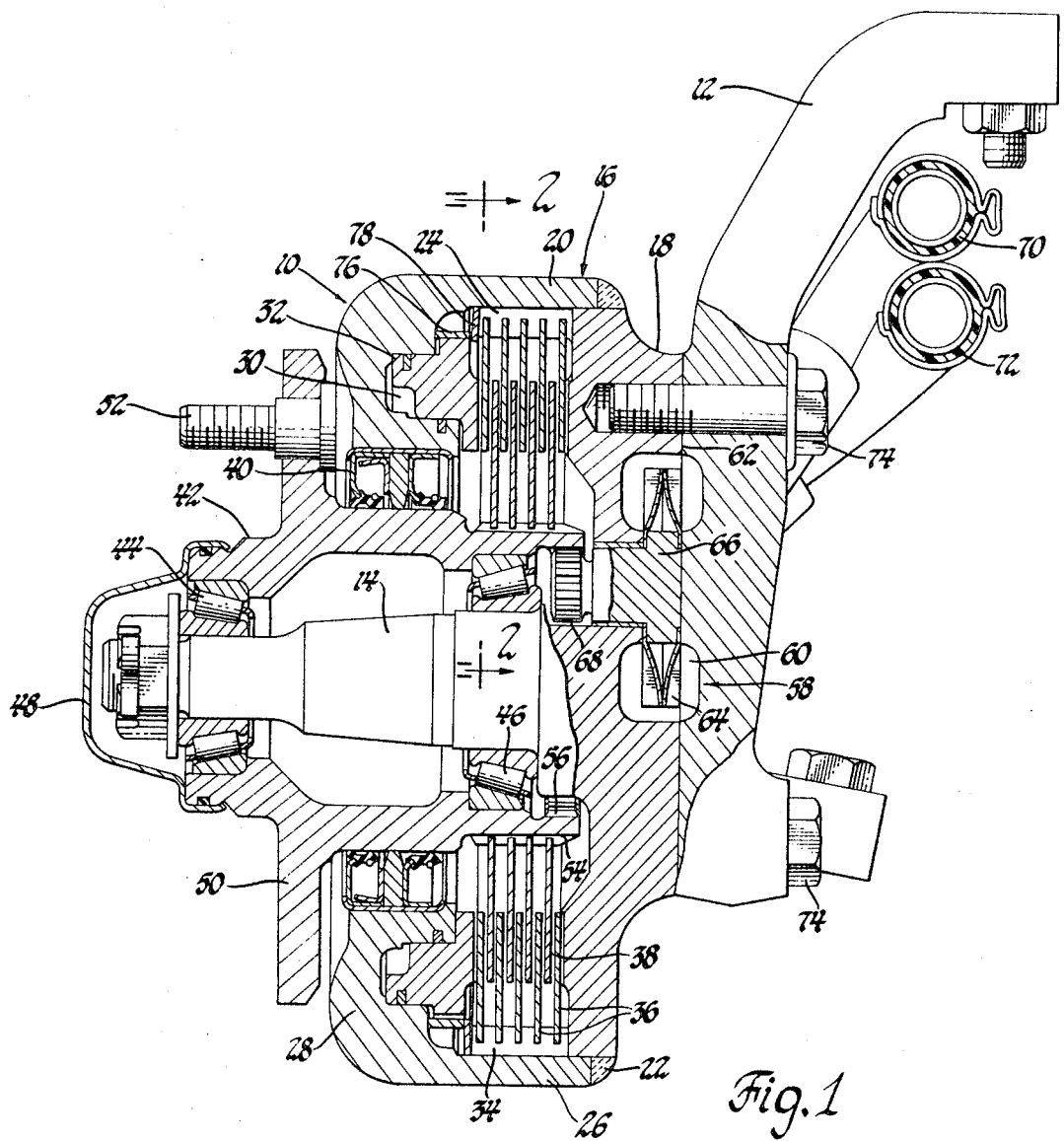
FIG. 1 is an elevation view of a front vehicle brake assembly embodying the invention, with parts broken away and in section.
Figure 2:
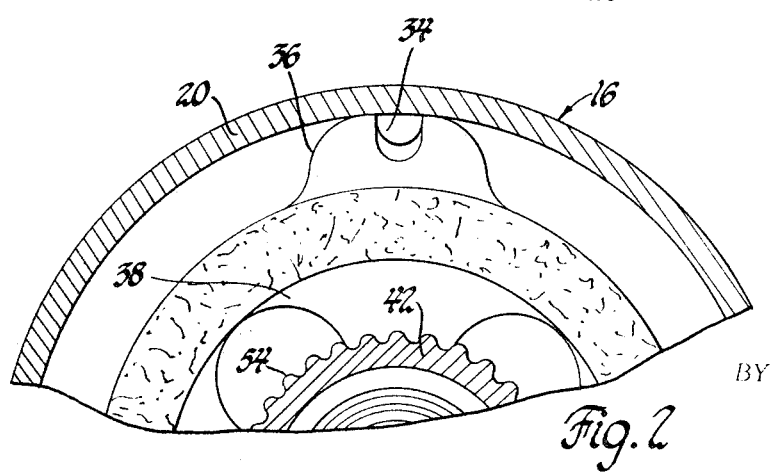
FIG. 2 is a partial section view taken in the direction of arrows 2-2 of FIG. 1.

The vehicle front brake illustrated in FIGURE 1 includes the brake assembly 10 which is mounted on a support member 12. The support member is the steering knuckle of the front brake. The steering knuckle is preferably a forging or casting and may include an integral steering arm. In the preferred embodiment illustrated in FIGURE 1, the knuckle is not provided with a spindle. Instead, the spindle 14 is provided as a part of the brake assembly 10, as will be described.

The brake assembly has a housing 16 which is formed by a backing plate member 18 and a cover section 20. The backing plate member 18 and the cover section 20 are joined in a suitable manner, such as by weld 22, so that the housing sections may not be readily disassembled for field service. Weld 22 also seals the cover section and the backing plate member and these portions of housing 16 form a braking chamber 24. The cover 20 is generally annular in form and has a circumferential portion 26 defining the outer part of braking chamber 24. The cover section also has a radially and inwardly extending portion 28 in which a brake apply pressure chamber 30 is formed. The brake apply piston 32 is mounted in chamber 30 so that brake pressure delivered to chamber 30 moves piston 32 in the brake apply direction. The inner side of the cover circumferential portion 26 is suitably provided with splines 34 which provide for the mounting of the stationary braking plates 36. These plates are interleaved with the rotatable braking plates 38. Both types of braking plates are mounted in the brake chamber 24 and so arranged as to be moved into friction braking engagement by movement of piston 32. A seal assembly 40 is provided at the inner part of the radially inwardly extending cover portion 28 and cooperates with a sealing surface on the wheel hub 42 to prevent the escape of brake cooling fluid to the atmosphere from braking chamber 24. The hub 42 is mounted on bearings 44 and 46 for rotation on the spindle 14. The cup 48 seals the outer end of the hub 42 to prevent fluid leakage through bearing 44 to the atmosphere. The hub also has the usual wheel mounting flange 50 provided with suitable wheel mounting studs 52. The inner end of the hub has external splines 54 receiving the rotatable braking plates 38. The inner end of the hub is also provided with an external gear 56 which provides a drive for the cooling fluid pump assembly 58.

In the embodiment shown in FIG. 1, a pump chamber 60 is formed in the backing plate member 18 and the support member 12 so that the split line 62 where the backing plate member and the support plate member are jointed intersects the pump chamber. The pump also includes an impeller 64 mounted on an impeller drive member 66. Drive member 66 is rotatably mounted in the backing plate member 18 and includes a gear 68 which meshes with the internal gear 56 of the hub so that when the hub rotates the pump impeller 64 pumps cooling fluid through the braking chamber 24. The cooling fluid receives heat from the braking surface, passes out of the braking chamber 24 and into conduit 70. The heated cooling fluid passes through a suitable heat exchanger remotely positioned from the brake assembly and the cooled cooling fluid is returned to the brake assembly through circuit 72. When desired, the arrangement may be such that the pump assembly 58 pumps heated cooling fluid from brake chamber 24 to the heat exchanger and the cooled cooling fluid is returned directly to the braking chamber 24.

The brake assembly 10 is bolted to the steering knuckle support member 12 by a suitable number of bolts 74. It has been found that three such bolts are entirely sufficient.

When the vehicle having the brake assembly installed is running normally, the hub 44 is rotating, driving the rotatable backing plates 38 and the pump impeller 64. Thus, cooling fluid is being circulated freely to provide continuous lubrication for bearings 44 and 46, seal assembly 40, gears 56 and 68, and the bearing surfaces of the pump impeller drive member 66. When the brakes are applied, braking fluid in chamber 30 is pressurized to move piston 32 to the right to compress the stationary and rotatable brake plates 36 and 38 into friction braking relation with each other and with the brake surfaces formed on the piston 32 and the backing plate 18. The piston 32 is provided with an adjusting mechanism that automatically adjusts the piston. The adjusting mechanism includes a one-piece band 76 pressed on the outer diameter of the piston 32 and engaged on one side by Belleville spring 78. This spring is mounted in the braking chamber 24 adjacent to the ends of splines 34. The width of bank 76 relative to the peripheral surface of piston 32 on which the band is tightly fitted is such that when the piston moves sufficiently in the brake apply direction, Belleville spring 78 prevents movement of band 76 while the piston 32 moves slightly to the right relatively to band 76, as seen in FIG. 1. Thus, the band extends further leftwardly on the piston than before and engages the cover section 20 to stop the retracting movement of the piston after such movement has taken place when the pressure in chamber 30 is relieved. This movement is obtained by the action of Belleville spring 78 and is sufficient to disengage the backing plates.

Figure 3:
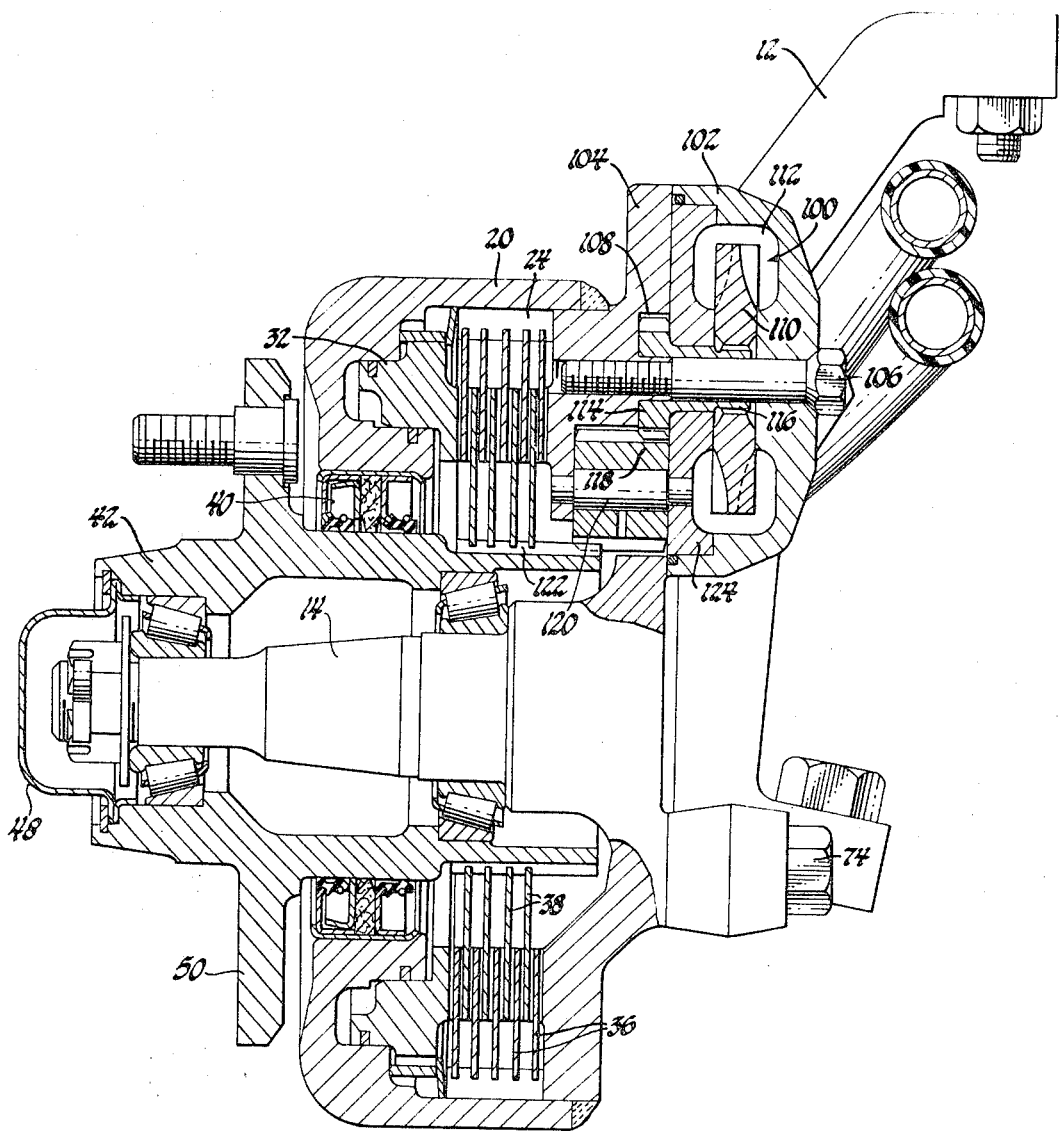
FIG. 3 is a view of a modified brake assembly similar to the view of FIG. 1.

The brake assembly modification illustrated in FIG. 3 has many parts which are similar to the parts of the brake assembly illustrated in FIG. 1. Therefore, the same reference numerals are utilized where possible. The pump mounting and drive arrangement is different. In the construction of FIG. 3, the pump assembly 100 includes a housing 102 which is mounted on the backing plate 104 by the bolt 106. Backing plate 104 is suitably formed to provide a gear chamber 108 which is open to the braking chamber 24 of the cover section 20. Gear chamber 108 is also open at the surface of the backing plate 104 opposite the portion of chamber 24 containing the brake plates 36 and 38. This portion of the gear chamber 108 is closed by the pump housing 102 and is suitably sealed.

The pump assembly includes the impeller 110 mounted in the pump chamber 112 and driven by gear 114. The impeller 110 is shown as being attached to the quill shaft portion 116 of gear 114 by splines. Gear 114 is mounted to rotate on a portion of the pump mounting bolt 106. The portion of the gear 114 having drive teeth formed thereon is contained within a portion of gear chamber 108 and is in driven mesh with the idler gear 118, also mounted in gear chamber 108. The idler gear is mounted on a suitable shaft 120 having provision for allowing the idler gear to rotate. The hub 42 has splines 122 similar to the splines 54 of the FIG. 1 assembly, but also acting as a drive gear for idler gear 118. The gear arrangement is such that the pump will be driven at a substantially higher speed than the hub, permitting the use of a pump of adequate capacity but mall enough to be integrated as a part of the brake unit.

The pump assembly is also provided with an integral cover plate 124 which defines a portion of the pump chamber 112 and receives the quill shaft portion 116 of gear 114 therethrough. When the pump is assembled as a part of the brake assembly, the split line between the backing plate 104 and the pump housing is so located that the cover plate 124 is secured tightly between the outer surface of the braking plate and the housing 102. Cover plate 124 also supports one end of idler gear shaft 120.

When the pump housing 102 is formed as a separate cover, the pump and its gears can be readily removed and serviced without removing the entire brake assembly from the support member 12. If the housing 102 is formed as a part of the support member 12, the pump would be serviced by removing the mounting bolts 74 as well as the pump mounting bolt 106 and then removing the brake assembly from the support member.

What I claim is:
1. A brake assembly comprising:
   a housing having a backing plate member and a cover section joined in fluid sealing relationship to form a braking chamber,
   friction braking means in said braking chamber,
   a support member having said backing plate member detachably secured thereto by securing means,
   brake actuating means in said housing remote from said support member and axially opposite said backing plate member for energizing said friction braking means,
   one of said members including a spindle adapted to have a wheel hub rotatably mounted thereon to be braked by said friction braking means and mounted thereon in fluid sealing relation with said housing,
   a brake cooling fluid pump chamber is said brake assembly on the opposite side of said friction braking means from said brake actuating means and having a brake cooling fluid pump therein,
   drive means for said pump within said brake assembly housing and adapted to be connected in drive relation with the wheel hub to be braked,
   and passage means within said brake assembly including said pump chamber and said braking chamber and providing for connection to heat exchanger means remote from said brake assembly and further providing for the circulation by said pump of colling fluid in heat receiving relation with said friction braking means and the delivery of heated cooling fluid to the remote heat exchanger means and the receipt by the brake assembly of cooled cooling fluid from the remote heat exchanger means.

2. The brake assembly of claim 1,
   said pump chamber being defined in part by said support member and in part by said backing plate member.

3. The brake assembly of claim 1 in which said backing plate member and said housing cover section are joined by suitable permanent means such as a weld so that said brake assembly housing including said braking means is removable from and replaceable on said support member is service only as a unit.

4. The brake assembly of claim 1 in which said pump drive means includes a first gear adapted to be driven by the wheel hub to be braked and a second gear in drive relation with said first gear and connected to drive said pump, the pump drive means overall ration being such that the speed of said pump is greater than the speed of the wheel hub when the hub is rotating on said spindle.

5. The brake assembly of claim 1,
   said pump housing being a part of at least one of said members and said pump chamber being defined in part by said at least one of said members and in part by a pump cover plate,
   said pump drive means including a pump shaft extending into said pump chamber and having a pump impeller mounted thereon,
   said pump impeller and said pump drive means and said pump cover plate being retained in the operative position by said at least one of said members and suitable securing means.

6. The brake assembly of claim 1, said brake actuating means including
   a pressure chamber formed in said brake assembly housing cover,
   a brake apply piston mounted in said chamber and movable to engage and disengage said friction brake means in braking relationship,
   and brake adjusting mechanism including a bank pressed on the outer diameter section of said piston and being wider in an axial direction than the outer diameter section of said piston and having one edge remote from the said friction braking means engageable with a suitable abutment formed on said brake assembly housing cover in said braking chamber, and a Belleville spring mounted in said braking chamber with the outer periphery thereof engaging suitable abutment means formed on said brake assembly housing cover and the inner periphery thereof engaging the edge of said adjusting band adjacent to said friction braking means,
   so that brake applying movement of said piston acts against said Belleville spring, with a predetermined amount of such brake applying movement causing said Belleville spring to be so engaged with the abutment means associated therewith as to prevent further movement of said adjusting band while permitting further movement of the piston, thereby causing a slipping action between said band and said piston to reposition said band on said piston in a direction remote from said friction braking means to establish a retracted position of said piston requiring less retracting movement than prior actuating movement as determined by the amount of lineal slippage of said band on said piston during the brake applying movement.

PO-1050
(5/69)

UNITED STATES PATENT OFFICE
CERTIFICATE OF CORRECTION

Patent No. 3,584,708          Dated  June 15, 1971

Inventor(s)  Burnette Heck

It is certified that error appears in the above-identified patent and that said Letters Patent are hereby corrected as shown below:

Column 2, line 17, the word "jointed" should read -- joined --.
Column 2, line 53, the word "bank" should read -- band --.
Column 3, line 19, the word "mall" should read -- small --.
Column 3, line 63, the word "colling" should read -- cooling --.
Column 4, line 17, the word "ration" should read -- ratio --.
Column 4, line 39, the word "bank" should read -- band --.

Signed and sealed this 11th day of January 1972.

(SEAL)
Attest:

EDWARD M.FLETCHER,JR.          ROBERT GOTTSCHALK
Attesting Officer               Acting Commissioner of Patents